United States Patent [19]

Savery

[11] Patent Number: 5,111,883
[45] Date of Patent: May 12, 1992

[54] VACUUM APPARATUS AND PROCESS FOR IN-SITU REMOVING UNDERGROUND LIQUIDS AND VAPORS

[76] Inventor: Winsor Savery, 14655 Champ Forest Dr., Houston, Harris County, Tex. 77069

[21] Appl. No.: 527,899

[22] Filed: May 24, 1990

[51] Int. Cl.⁵ ............... E21B 43/18; E21B 43/22; E21B 43/12
[52] U.S. Cl. .................. 166/269; 166/73; 166/78; 166/242; 166/267; 166/305.1; 166/330; 166/334; 166/370
[58] Field of Search ............ 166/268, 269, 306, 305.1, 166/370, 371, 369, 380, 386, 73, 78, 242, 330, 332, 334, 266, 267

[56] References Cited

U.S. PATENT DOCUMENTS

| | | | |
|---|---|---|---|
| 3,980,138 | 9/1976 | Knopik | 166/372 X |
| 3,993,130 | 11/1976 | Papp | 166/330 |
| 4,026,355 | 5/1977 | Johnson et al. | 166/369 X |
| 4,183,407 | 1/1980 | Knopik | 166/50 X |
| 4,593,760 | 6/1986 | Visser et al. | 166/370 X |
| 4,691,778 | 9/1987 | Pyne | 166/321 X |
| 4,886,119 | 12/1989 | Bernhardt et al. | 166/242 X |
| 4,890,673 | 1/1990 | Payne | 166/267 X |
| 4,946,312 | 8/1990 | Loock et al. | 166/369 X |
| 4,982,788 | 1/1991 | Donnelly | 166/267 X |

Primary Examiner—Hoang C. Dang
Attorney, Agent, or Firm—Kenneth D. Baugh

[57] ABSTRACT

An apparatus 10 for removing underground contaminants from a contaminated subsurface area 16 is provided. The apparatus 10 includes a wellbore 12 aligned in the contaminated subsurface area for releasing predetermined substances into selected areas of the contaminated subsurface area so that the substances and contaminates are intermixed and for recovering the intermixture of substances and contaminates from selected areas of the contaminated subsurface area. A driving apparatus 83 is provided for rotating and sliding an inner housing 68 of the wellbore 12 along first and second predetermined paths respectively. An injection system 22 injects the predetermined substances into the wellbore 12 and recovery system 26 applies pressure to the wellbore so that the intermixture of substances and contaminants can be extracted from the contaminated area. The intermixture of substances and contaminates are then collected and stored for subsequent removal in a vacuum tank 28.

59 Claims, 8 Drawing Sheets

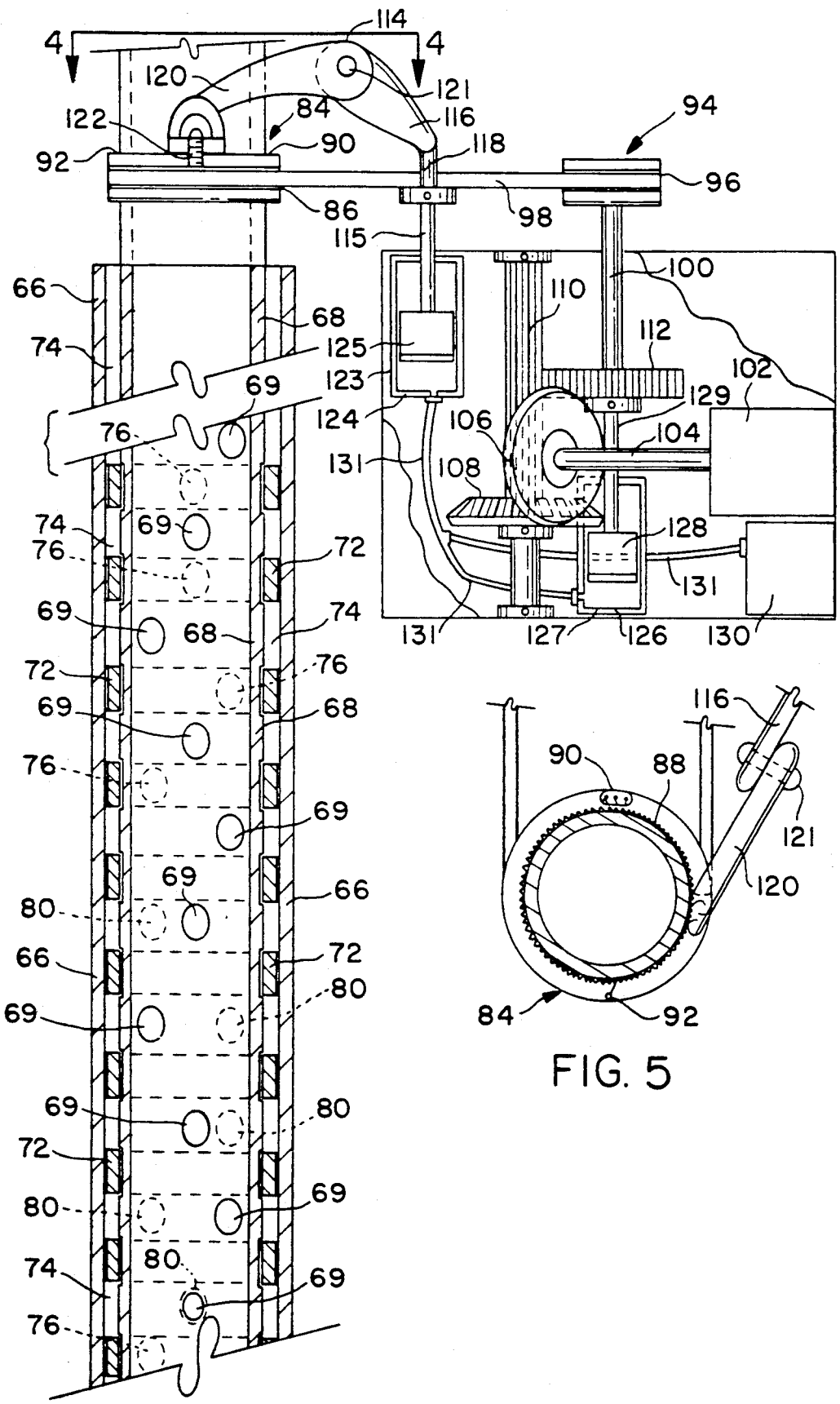

5,111,883

VACUUM APPARATUS AND PROCESS FOR IN-SITU REMOVING UNDERGROUND LIQUIDS AND VAPORS

TECHNICAL FIELD

The present invention relates to a system that is designed to completely remove liquid contaminants from landfills and subsurface areas. More particularly a system is provided which, by selectively and sequentially using a vacuum alone and/or in conjunction with heat, water, chemicals or microbes, the removal of contaminants is facilitated from discreet "zones" throughout the entire length and breadth of a contaminated subsurface area.

The contamination of the subsurface area known as the vadose zone, which is the zone between the ground and underground water tables or aquifers, is a major problem throughout the world. Many of these contaminants have been indentified as carcinogens. The contamination of the vadose zone is normally the result of the leaking of waste dumps; or because of chemical or oil spills. This contamination can also be caused by leaking chemicals or oil from underground storage tanks. The threat to human health occurs when these contaminants are carried by rain water into the underground water supply.

Volatile liquid contaminants are often removed from subsurface areas by excavating the contaminated area and then decontaminating it on the surface. There are significant drawbacks and disadvantages to this method, however. Not only are these excavation-based methods extremely expensive, they have an even greater disadvantage in that residents of areas near the contaminated sites often raise objections to the above ground reclamation of polluted soil in their neighborhoods.

Another more recent problem is associated with landfills to which toxic-chemicals are transported for burial after they have been excavated. These chemicals normally include some very mobile contaminants and often these mobile contaminants will diffuse into the barriers of the landfills thereby breaking through into the vadose zone over drinking water aquifiers. Because of this additional problem, it now makes it even more difficult to excavate contaminated sites and ship them off for reburial in supposedly secure landfill sites. Because of these problems, reclamation will have to be done on or in the site, that is, "in-situ". It also means that the landfills themselves, most of which are very deep, will have to be decontaminated "in situ".

Clearly, what is needed is a reliable and efficient method of cleaning up the toxic chemicals, oil and gasoline "in situ".

DESCRIPTION OF PRIOR ART

There have been a number of systems and methods developed for in situ removal of pollutants. One such system is disclosed in U.S. Pat. No. 4,167,973. In this patent, a system and method are disclosed which includes flushing the pollutants into a water removal well and then pumping them therefrom onto the surface. This process is not only inefficient, but the flushing can actually force the contaminants into the ground water.

Another system and method is disclosed in U.S. Pat. No. 3,980,138. This system provides for the large scale recovery of liquid and vaporized contaminants from the vadose zone using suction. The patented apparatus has limited applicability because the suction is taken from just one point in the polluted zone. As a result the device is decreasingly effective with contaminants that are twenty feet or more from the single recovery point.

There is an additional problem that plagues "single point" suction recovery systems. As air, gas and liquids are pumped to a single suction point, they soon create air and water channels that by-pass the contamination. An even greater problem is that the single point recovery system tends to pull air from the surface and bypass the target pollutants. U.S. Pat. No. 4,026,355, attempts to solve the problems inherent with single-point recovery wells by using multiple wells to pull gas from several subsurface points through a series of wells. However, this system has the drawback of requiring the expense of an excessive number of wells. U.S. Pat. No. 4,183,407 represents another attempt to remove the volatile liquid contaminants from the entire sub-surface zone, rather than the immediate vicinity of the vacuum wellbore. This invention attempts to create a multitude of recovery points by running horizontal piping out from the base of the well. The drawback to this unit is that it is difficult and expensive to install and it diffuses its vacuum effect through a multitude of openings.

Still another system is disclosed in U.S. Pat. No. 4,183,407. However this system only serves to increase the relative pressure differential pulling the contaminants to the recovery point and does not improve the recovery point or the vacuum recovery balance of the entire unit. What it does, instead, is to increase the pressure differential at a point that is distant from the wellbore. This is done at the expense of the vacuum drag on the area that is near to the "hub" of the spokes of the "wheel design" of that system.

DISCLOSURE OF THE INVENTION

An apparatus for removing underground contaminants from a contaminated subsurface area is provided. The apparatus includes means aligned in the contaminated subsurface area for releasing predetermined substances into selected areas of the contaminated subsurface area so that the substances and contaminates are intermixed. This means also recovers the intermixture of substances and contaminates from selected areas of the contaminated subsurface area. The releasing and recovering means is provided with means for rotating an element thereof along a first predetermined path and for sliding this same element along a second predetermined path. The apparatus is provided with means for injecting the substances into the releasing and recovering means. Means for applying pressure to the releasing and recovering means is provided so that the intermixture of substances and contaminants can be extracted from the contaminated subsurface area. Means is provided and coupled to the pressure applying means for collecting and storing the intermixture of substances and contaminants as the intermixture is extracted from the contaminated subsurface area.

A method for removing underground contaminants from a contaminated subsurface area in accordance with the principles of the invention includes the first steps of positioning a releasing and recovering means in the contaminated subsurface area and then activating a rotating and sliding means to sequentially and selectively and close successive open ports of the releasing and recovering means.

A vacuum pressure is sequentially and selectively applied to each open port in the releasing and recovering means to recover contaminants from an adjacent area of the contaminated subsurface area.

The rotating and sliding means is then activated to close each of the successive opened ports in the releasing and recovering means before the next port thereof is opened. As a result upon the application of vacuum pressure to the successive opened ports recovery of the contaminants in the entire contaminated subsurface area can be accomplished.

BRIEF DESCRIPTION OF THE DRAWING

The details of the invention will be described in connection with the accompanying drawing in which:

FIG. 4 is an exposed side view of the wellbore of FIG. 1 illustrating the movement of the inner housing and driving means of the wellbore in accordance with the principles of the invention.

FIG. 5 is a cross-sectional top view of the wellbore taken along lines 4—4 of FIG. 4 in accordance with the principles of the invention.

DETAILED DESCRIPTION OF THE PREFERRED EMBODIMENTS

Figure 1:
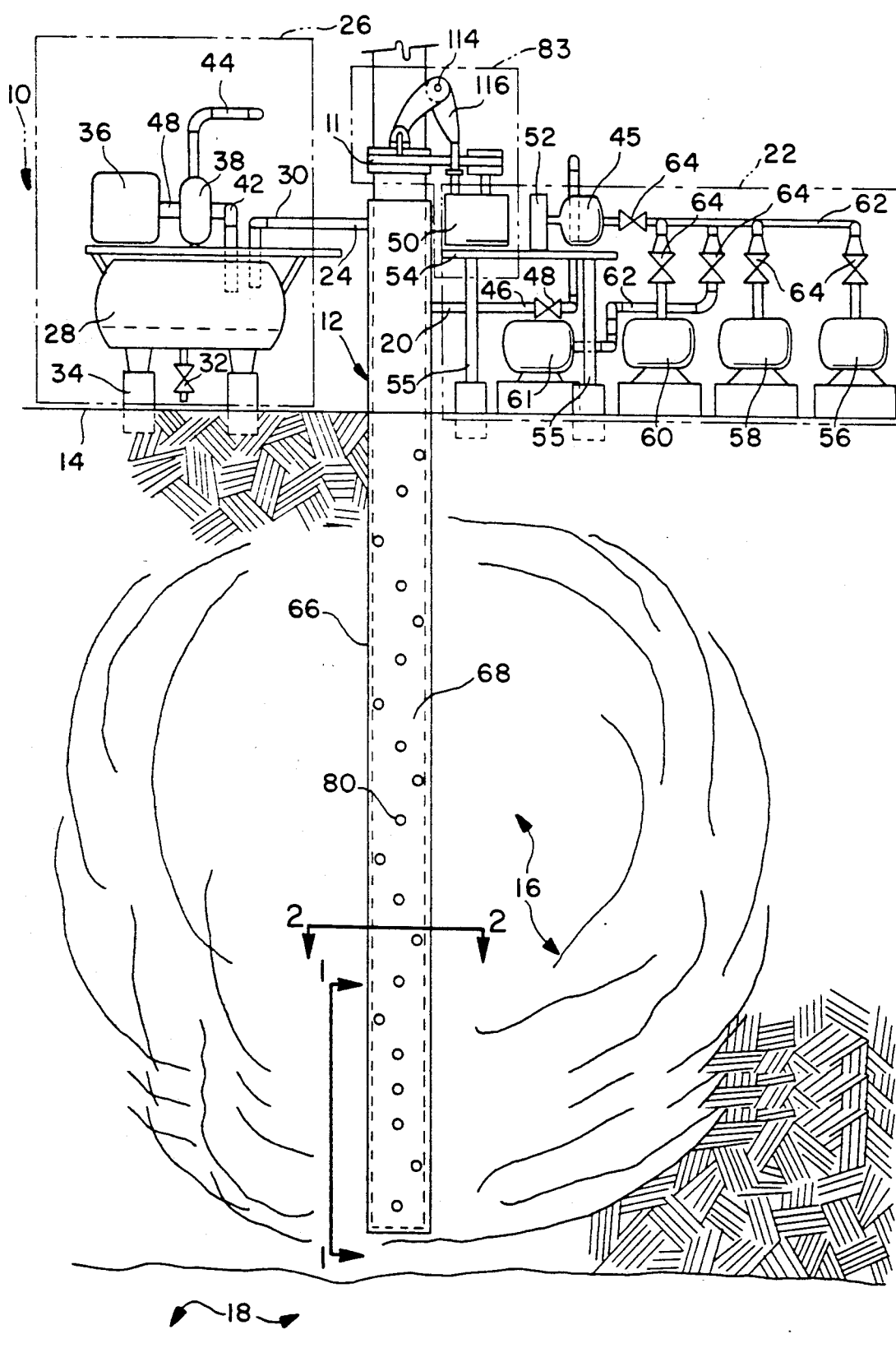
FIG. 1 is a diagrammatic view of a surface mounted vacuum apparatus for removing underground contaminated liquids and vapors in accordance with the principles of the invention.
Figure 2:
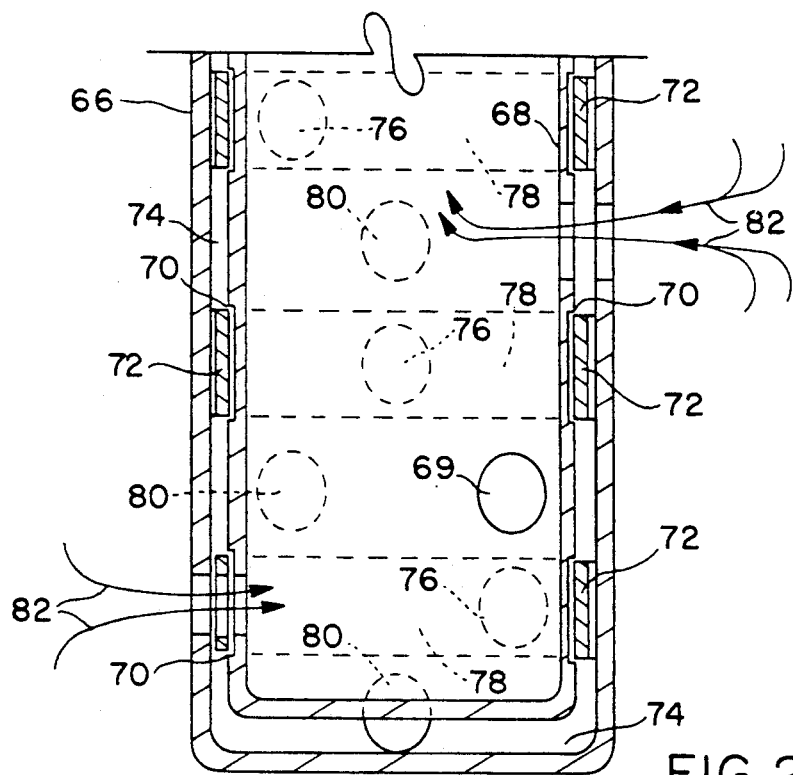
FIG. 2 is a partial cross-sectional side view of a wellbore taken along lines 1—1, of FIG. 1 in accordance with the principles of the invention.

Referring now to FIG. 1, there is shown a vacuum apparatus, generally designated by the numeral 10 for removing underground contaminants and vapors from a contaminated subsurface area 16. The vacuum apparatus 10 is provided with an extraction well or wellbore, generally designated by the numeral, 12 which extends from a surface area 14 into the contaminated subsurface target area 16 which is above aquifers (water tables) 18. The wellbore 12 is coupled at an input junction 20, thereof to an injection system, generally designated by the numeral, 22 and at an output junction 24 thereof to an extraction or recovery system, generally designated by the numeral, 26.

The recovery system 26 is provided with a vacuum tank 28, which serves as a condenser and container for water vapor and contaminants. The vacuum tank 28 is coupled to the output 24 of the wellbore 12 by piping 30. The vacuum tank 28 is provided with a drain valve 32 which allows the removal of recovered contaminated water and vapors. The vacuum tank 28 is supported on the surface area 14 by support posts 34. A motor 36 is coupled to drive a vacuum pump 38 by a shaft 48. This permits the creation of a vacuum in the tank 28 through a coupling pipe 42. The vacuum pump 38 is also provided with an exhaust member 44 which leads to a suitable collection point (not shown) for extracting air and vapors that must be removed to create the vacuum in the vacuum tank 28. The exhaust member 44 is suitable to reduce the pressure in vacuum tank 28 to less than 0.50 percent of that of the atmosphere.

The injection system 22 of the vacuum apparatus 10 is coupled at input injunction 20 to a pump 45 through pipe 46 and a valve 48. The pump 45 is controlled by a motor 50 coupled thereto by a shaft 52. The pump 45 and motor 50 are supported above the surface area 14 by a platform member 54 which includes supports 55. A steam generator 56, heater 58, chemical storage tank 60 and water supply 61 are coupled to the pump 45 by piping 62 and control valves 64. The chemical storage tank 60 is for providing such chemical additives or microbes as are necessary to enhance the recovery of volatile liquid contaminants from the polluted contaminated subsurface area 16. The control valves 64 are used to control the flow of the contents of the generator 56, heater 58, tank 60 and water supply 61.

The wellbore 12 is illustrated in detail in FIG. 2, 3, 4 and 5. The wellbore 12 is provided with an outer screen or housing 66 and an inner pipe or housing 68. The inner housing 68 is provided with holes 69 and slots 70 for receiving sealing rings 72. The sealing rings 72, positions the inner housing 68 in spaced relationship to the outer housing 66. This creates a space or annulus 74 between the inner housing 68 and outer housing 66. The sealing rings 72 prevent the loss of vacuum in the wellbore in the same way that piston ring prevents loss of pressure in the piston chamber of an internal combustion engine.

The sealing rings 72 are provided with holes 76. Additionally, a slot 79 is provided which allows the sealing ring 72 to expand tightly against the outer housing 66.

Figure 3:
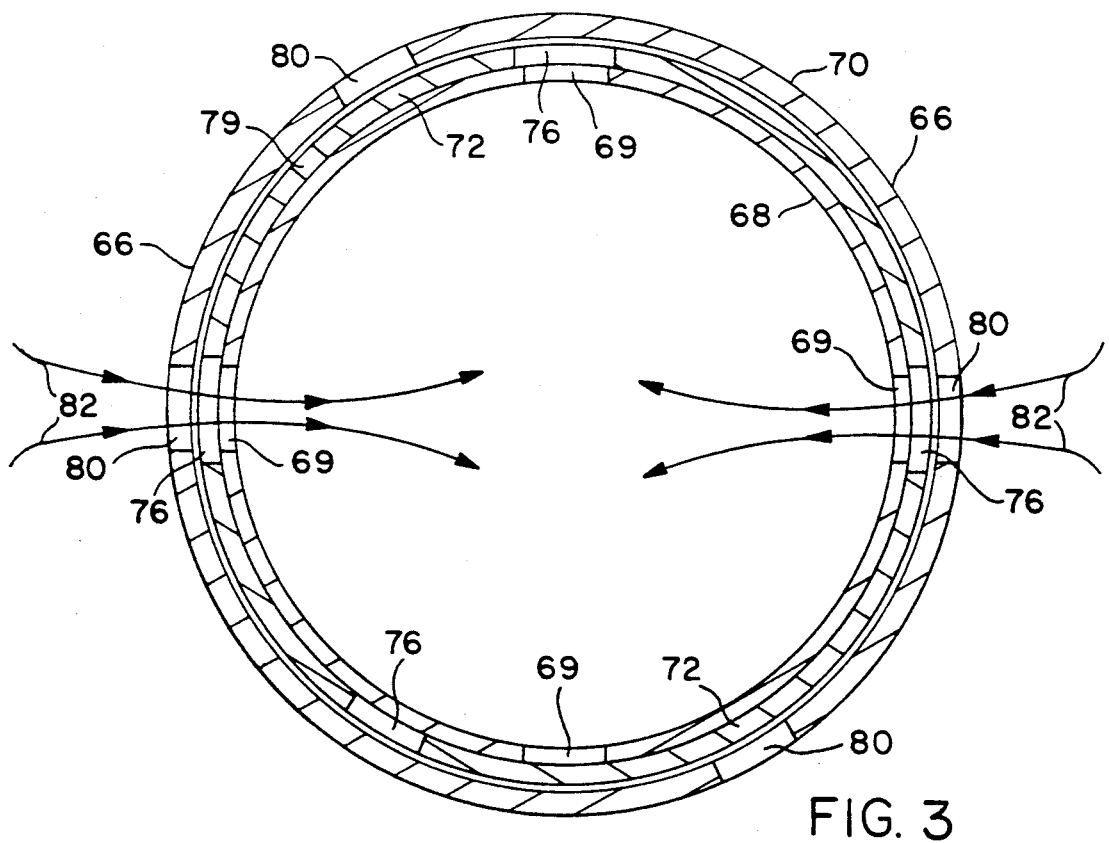
FIG. 3 is a cross-sectional view of the wellbore taken along lines 2—2 of FIG. 1 in accordance with the principles of the invention.

The outer housing 66 is provided with openings 80 formed therein. The holes 69 in the inner housing are alignable with the holes 76 in the sealing ring 72 and the holes 80 in the outer housing 66 when they are not blocked by non-preforated portions 78 of the sealing rings. When this occurs, a passage 82 is formed through which gases and fluids can pass in and out of the wellbore 12 (FIG. 3).

The inner housing can be rotated and slid up or down in the outer housing 66 so fluids and gases can flow through the bottom portions of the wellbore 12 when the bottom row or rows of openings 69, 76 and 80 are opened to form a passage 82. If the inner housing 68 is raised, it would close off that bottom port 82 and depending on how it was rotated it could open up one or more of the other ports 82 also.

The rotation and slidable movement of the inner housing is accomplished by a drive apparatus, generally designated by the numeral, 83 which is illustrated in FIGS. 4 and 5. The drive apparatus 83, is provided with a first drive member generally designated by the numeral 84.

The drive member 84 is formed with a recessed groove 86 in intermediate portions thereof and a plurality of teeth 88 (FIG. 5) formed on an internal surface thereof. The drive member 84 is provided to drivingly engage the inner housing 68 by aligning the teeth 88 in locking engagement around the inner housing. The drive member 84 is provided with a hinge 90 and lock 92 to allow the drive member 84 to be placed around and locked onto the inner housing.

The drive apparatus 83 is provided also with a second drive member, generally designated, by the numeral 94. The drive member 94 includes a recessed groove 96 formed therein. A belt 98 is provided which is aligned in the groove 96 of the drive member 94 and the groove 86 of the drive member 84. The belt 98 drivingly, couples the drive member 94 to the drive member 84. A shaft 100 is rotatably coupled to the drive member 94. A motor 102 is coupled to a gear 106 which in turn drives a gear 108. The gear 108 is coupled to rotate a shaft 110. The shaft 110 drivingly engages a gear 112 which is coupled to rotate the shaft 100. This in turn, rotates the drive members 94 and 84 and thus rotation of the inner housing 68 is accomplished.

The drive apparatus 83 is provided with a third drive member, generally designated by the numeral 114. The drive member 114 is provided with a first arm 116 having a shaft 118 coupled to one end thereof. The other end of the arm 116 is pivotably coupled to a second arm 120 by a pivot pin 121. The arm 120 has a coupling member 122 formed thereon which is attached to the first drive member 84.

A first piston assembly, generally designated, by the numeral 123 is provided having a piston housing 124 and a piston 125 seated in the housing. The piston 125 is coupled to the shaft 118 of the arm 116 by a coupler 115.

A second piston assembly, generally designated by the numeral 126 is provided having a piston housing 127 and a piston 128 seated in the housing. The piston 128 is coupled to the shaft 100 by a coupler 129.

A pneumatic control device 130 is coupled through pneumatic lines 131 to pneumatically drive the piston assemblies 123 and 126. As a result, the drive member 94 can be raised or lowered by the sliding movement of the piston 128 and the drive member 84 can be raised and lowered by the sliding movement of the piston 125 and movement of the drive member 114. This, in turn, raises and lowers the inner housing 68, in the outer housing 66 of the wellbore 12. This, along with the rotation of the inner housing facilitates the opening and closing of ports 82 in the wellbore.

This is accomplished with slidable up and down movement of the inner housing 66 of two to three feet and rotation thereof of three hundred sixty degrees (360) in either direction.

The primary recovery process using the present invention involves lining up, say, holes 69, 76 and 80 to create passage 82 to vacuum out the volatile pollutants in the stratum closest to outer opening 80. This is continued until no traces of the target pollutants can be detected. Then the inner housing 68 is raised and/or rotated to close openings 80 and to open up another conduits(s) to allow another stratum to be vacuumed to the point that no further pollutants can be detected.

Figure 6:
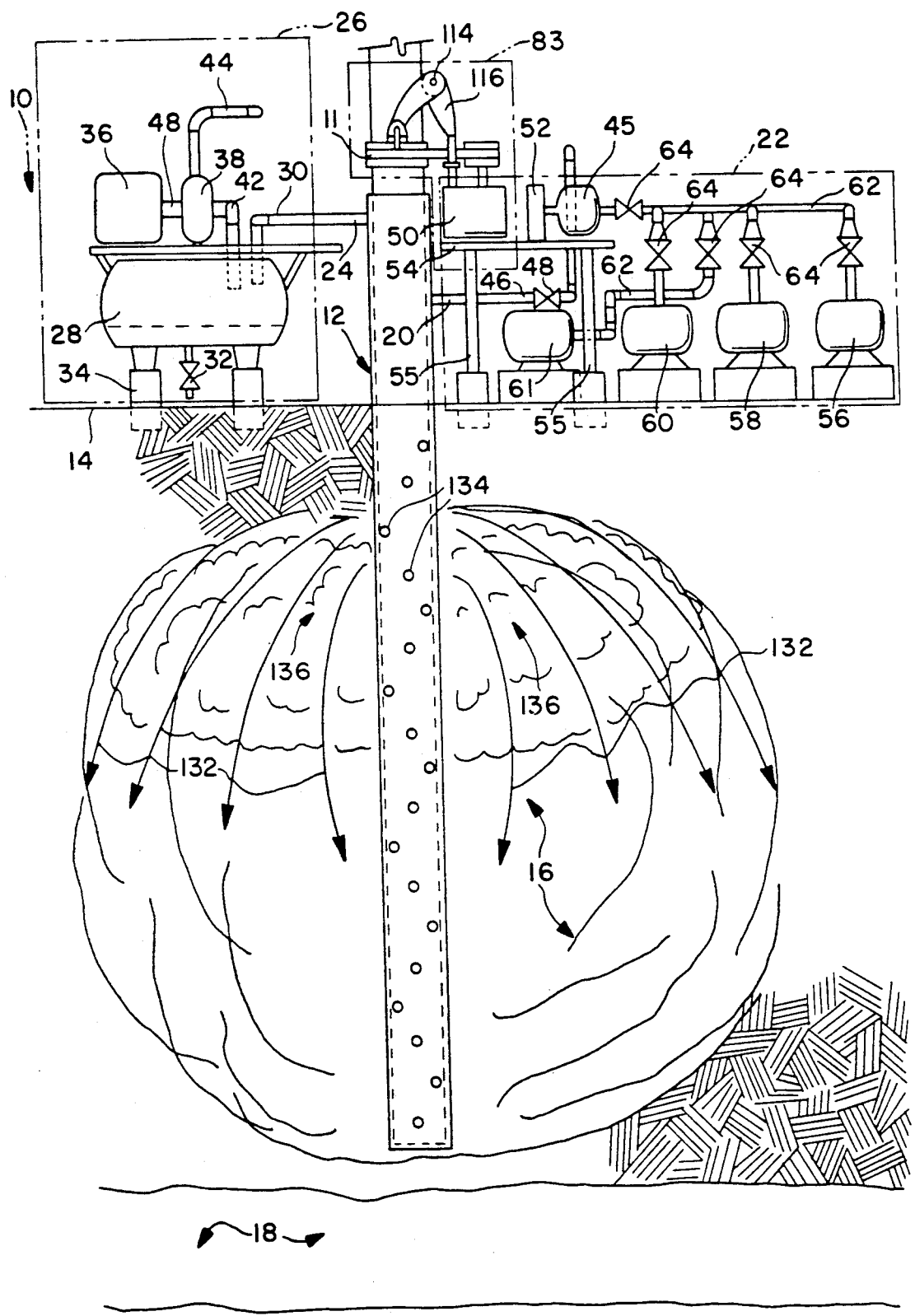
FIG. 6 is a diagrammatic view of a single well configuration of the vacuum apparatus during an injection made in accordance with the principles of the invention.

The apparatus 10 shown in FIG. 6, illustrates the operation of another a single-well configuration of the invention. This is a second recovery process. As illustrated, steam and surfactants (chemicals), if any, are released from the tanks 56 and 58 by opening the appropriate valves 64. This allows a steam and chemical jet 132 to be injected into the contaminated subsurface area 16. The inner housing 68 of the wellbore is positioned so only top ports 134 in an upper zone 136 of the contaminated subsurface area 16 are opened to release the steam and chemicals. The steam and chemical jet 132 move along the upper zone 136 of contaminated subsurface area 16, and gravity causes the condensed steam and chemicals to disburse throughout the subsurface area. This heats the contaminants and creates a chemical-in-water emulsion.

Figure 7:
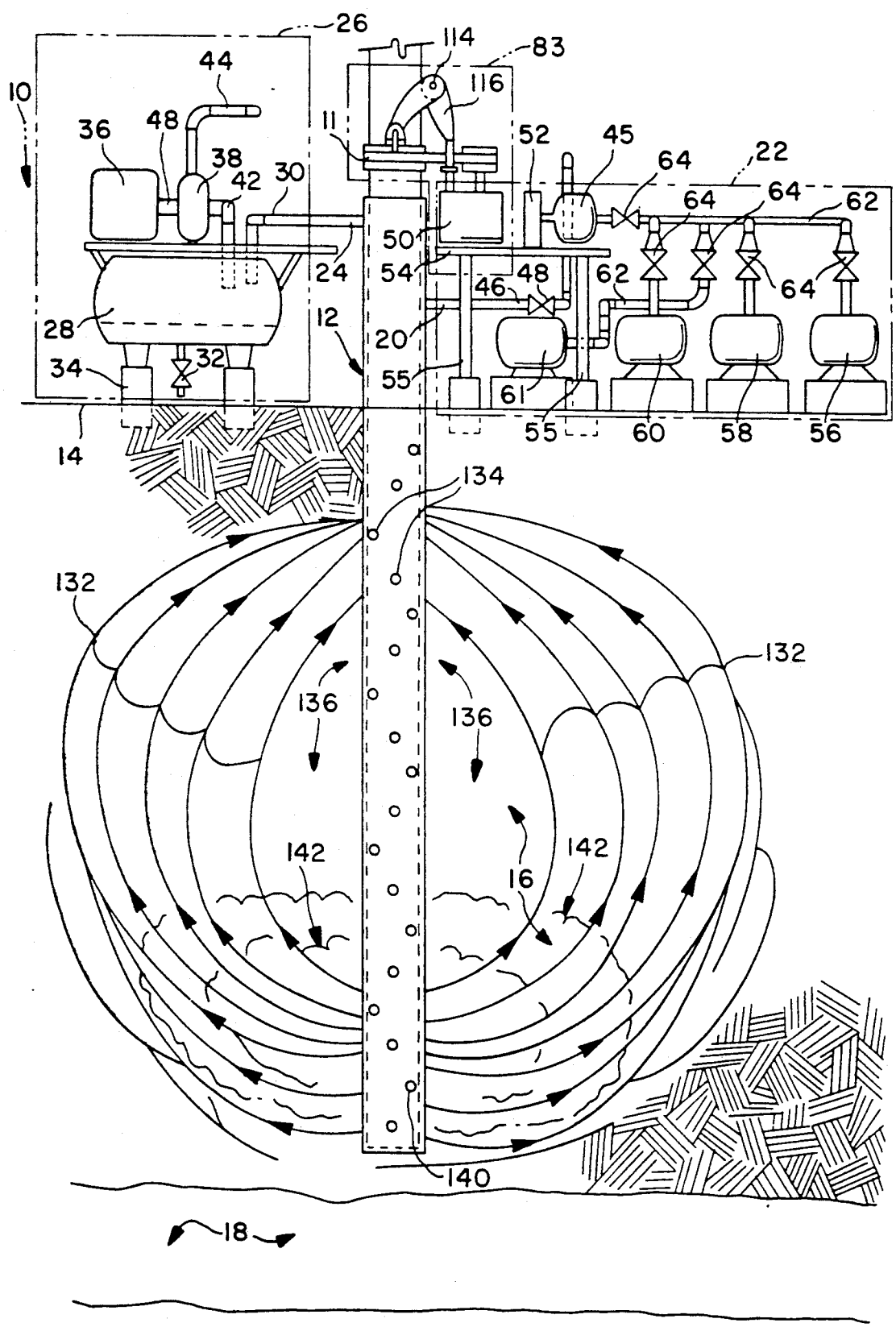
FIG. 7 is another diagrammatic view of the single well configuration during the injection mode in accordance with the principles of the invention.

As illustrated in FIG. 7, once this is accomplished, top ports 134 are closed and bottom ports 140 are opened so the steam and chemical Jet 132 pressurizes the base of the contaminated subsurface area. This causes movement on a parallel path in a lower zone 142 away from ports 140. When the pressure is at the maximum, then lower ports 140 are closed and upper ports 134 are reopened as recovery ports. The result is a flow of steam and surfactants towards upper ports 134, thereby creating turbulence and providing necessary energy to create a chemical-in-water or oil-in-water emulsion throughout the entire contaminated subsurface area 16.

When the contra-flow is completed, the next step is to open the bottom ports 140 of the well and concentrate a full vacuum drag on the bottom of the vadose zone and to pull the micellized chemical or oil-in-water emulsion from the upper stratas of the vadose zone where it will be drawn by the vacuum from upper ports 134 to the bottom strata thereby further saturating the vadose with chemicals. This is repeated over and over again, zone by zone and port by port until the recovery of the contaminants in the contaminated subsurface area 16 is completed.

The purpose of the "steam soak" with the steam 132 is to heat and chemically treat the contaminated subsurface area 16 thereby expediting the recovery of the liquid volatile contaminants through the increased vaporization that occurs with all such contaminants when heated. The heat and turbulence in conjunction with surfactants effectuates the total solubilization of the contaminants in the water in the vadose zone as chemical-in-water emulsions, which are pumped from recovery well 12.

The following table shows the temperature required to boil volatile liquid contaminants before and after being mixed with water.

| Component | Mixture boiling temp. (C.) | Pure component boiling point (C.) | Lb. steam/ Lb. component |
|---|---|---|---|
| Benzene | 68.3 | 80.1 | 0.092 |
| Toluene | 83.9 | 110.6 | 0.236 |
| Bromoform | 94.3 | 150.0 | 0.311 |
| Chlorobenzene | 91.0 | 112.5 | 0.405 |
| Hexachloroethane | 98.7 | 186.0 | 1.57 |

The first column in the above table shows the temperature at which the contaminants will boil off in the presence of steam and hot water. The second column shows the heat that would be required if the contaminants were not intermixed with the hot water and steam. Note that all of these contaminants can be boiled and thereby recovered by vacuum through well bore 12 without necessarily having to suspend the chemicals in a micellar emulsion.

The purpose of using surfactants (chemicals) in conjunction with this process is to micellize the chemical and oil contaminants into the hot water from the steam drive as it is used according to the above description and thereby recover pollutants with boiling points over 100° C. After the contaminants have been fully micellized (suspended in water), they can be vacuumed out of the formation through the wellbore as described. As a further benefit, this invention can be used to recover certain volatile liquid contaminants, especially PCBs, which have extremely high boiling points, (above 700° C.) and have a low solubility rate in water. In the case of these pollutants specialized surfactants are used in the present invention to create chemical-in-water or oil-in-water emulsions within the polluted zones, thereby enabling the emulsions to be vacuumed out of the formation.

There are three generic groups of chemicals that are currently best suited to create the chemical-in-water and oil-in-water emulsions which are integral to the decontamination methods, that can be effectuated by and in conjunction with the methods and apparatus of the present invention.

The first of these groups are the alcohol-ether-sulfates. These have passed the various ecological safety tests to the point that they have been cleared for human consumption by the U.S. F.D.A. The second of these, which is also non-toxic, is the alpha-olefin sulfonate class of chemicals and the third non-toxic candidate is the linear alkyl-benzene class sulfonates.

In a variation on the single well configurations that are described above, water can be injected into the contaminated zone along with the micelle-generating surfactants and then allowed to soak. Following the optimal "soak time", the micellized chemical contaminants can be drawn from the formation by vacuuming them either from one port of the wellbore, or from several ports, either together or individually.

The preferred embodiment is to use the ports individually in a sequence which causes the maximum intermixing of the surfactant and the contaminants thus maximizing recovery.

A Third Recovery Process involves the drying out of the contaminated area with hot air. This is accomplished by injecting superheated steam or hot air into the contaminated subsurface area 16. The hot air serves to volatilize chemical pollutants, including those remaining after a steam sweep has removed most of the contaminants and lowered the boiling points on the others. The hot air that is injected in the single-well configuration can either be recovered on the surface (which must be insulted from the atmosphere), or back through the wellbore in a "huff 'n puff" process which is explained in more detail below. Dry heating is accomplished by injecting air that has been heated to a level that is sufficiently high to vaporize all of the volatile liquid contaminants (superheated air) in the targeted vadose zone. This heat treatment can either be applied to the entire area or preferentially it can be applied to discrete layers or zones within the area by sequentially opening and blocking the ports in the wellbore.

Upon the completion of the heat treatment, the injection of super-heated air is stopped and the heated zone can then be "vacuumed" clean. This process is repeated "zone" by "zone" from the top of the contaminated area to the center of that area and then from the bottom up to the center. At all times a vacuum drag is kept on the bottom of the vadose zone to prevent the leakage of any contaminants into the atmosphere or aquifer. This process is repeated until all traces of the contaminants have been removed. This is known as a "huff 'n puff" process to petroleum engineers.

A fourth recovery process is similar to the second and third process in that it uses the opening and closing of holes in a wellbore to direct fluids through a vadose zone so as to effecutate the complete recovery of all pollutants. It differs from those processes in that it uses two or more wells to do what is done with a single well in the second and third process. With a single well process the steam and/or chemicals that are injected into the bottom strata from ports 140 are recovered through ports 134 in the same well. In a multi-well configuration the recovery would be done from ports 140 in a parallel well or wells thus assuring more distribution through the vadose zone.

Figure 8:
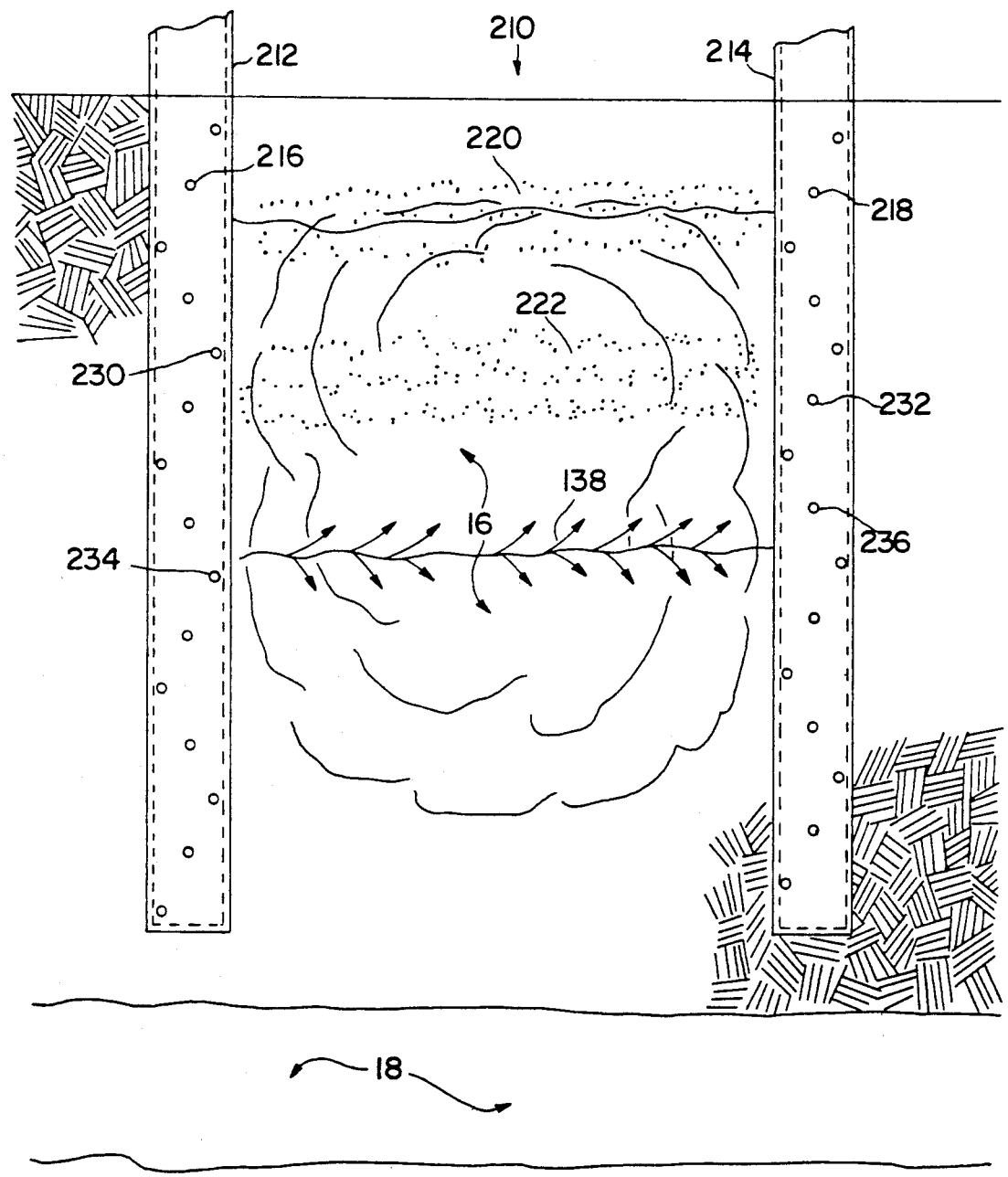
FIG. 8 is a diagrammatic view of a multiwell configuration of the vacuum apparatus illustrating vertical parallel wellbores which can be used and operated to inject substances such as toxiphilic microbes throughout the contaminated vadose zone in accordance with the principles of the invention.

FIG. 8 illustrates a multi-wellbore embodiment of the invention, generally designated by the numeral, 210. This embodiment can be used very effectively, for example, as a bioremediation embodiment of the invention. In this embodiment, two vertical parallelly spaced wellbores 212 and 214, are provided. It shall be understood that each wellbore 212 and 214 is provided with the injection, recovery and drive systems 22, 26 and 83, as is illustrated in FIG. 1. The wellbore 212 in FIG. 8 is shown in temporary usage as an injection well. Wellbore 214 is in use as a vacuum suction well. When wellbore 212 is rotated and/or slid to open up top port 216, simultaneously with top port 218 of wellbore 214 being opened, high pressure steam and chemicals can be driven from port 216 to port 218. This causes a communication channel 220 to be opened between the two wellbores 212 and 214 and serves to eliminate indigeous bacteria which might otherwise threaten the survival of the injected bacteria.

After the communication channel 220 has been opened, cold water is pumped through the communication channel 220 to cool off the area. Next, a gel or acqueous polymer solution is injected which will tend to adhere to the circumference of the channel and thereby minimize the absorption of the injected chemicals. When the chemicals have traversed the channel between port 216 and port 218, port 216 and 218 are closed, the injection of steam and chemicals is continued to be between those two ports as is shown taking place between port 230 and port 232. In this example used the continued injection will fill zone 222 as shown. When zone 222 has been saturated, the ports 230 and 232 are closed and ports 234 and 236 are opened and the procedure is repeated until zone 138 is completely saturated.

Figure 9:
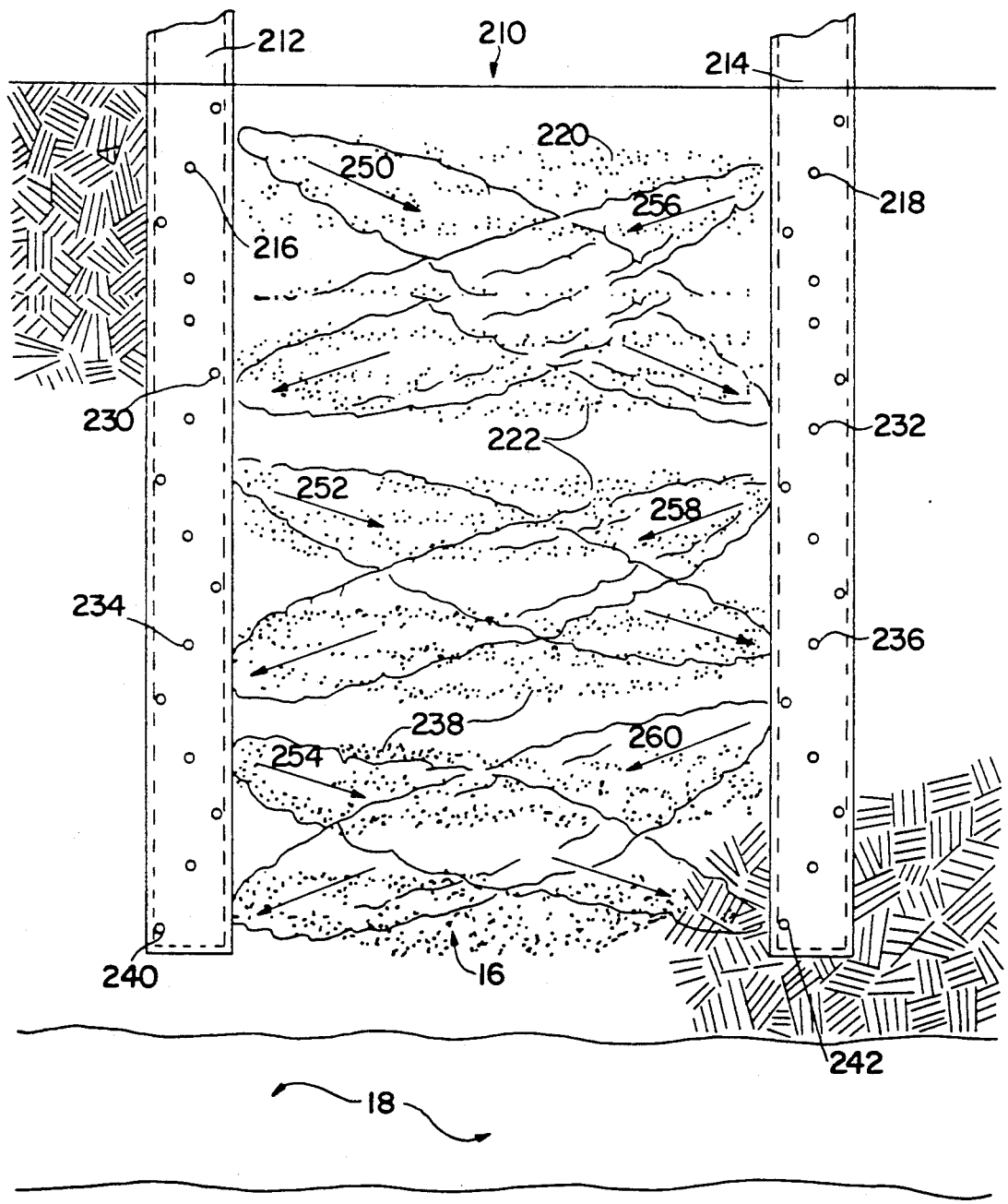
FIG. 9 is another diagrammatic view of the multiwell configuration of the vacuum apparatus illustrating vertical parallel wellbores which can be used to further disperse microbes and recover contaminants in accordance with the principles of the invention.

The contaminated subsurface area 16 can be also saturated with surfactants or toxiphilic bacteria as described above. The contaminated subsurface area 16 can be also saturated with surfactants or toxiphilic bacteria by forming diagonal channels, such as, channels 250, 252, 254, 256, 258 and 260 as shown in FIG. 9.

Communication between ports 216 and 236 would facilitate the saturation of zone 222 and the opening of a communication path between ports 230 and 242 would facilitate the saturation of zone 238. For example after toxiphilic microbes are injected, they will be supplied by air through the same patterns by which they were injected. An example of this process is where injected water is used in a criss-cross pattern through channels 250 and 256 patterns to move the chemicals (microbes) and facilitate the process of the microbes digesting the contaminants. After a colony of toxophilic bacteria is established in a contaminated area like this, the wellports in both wellbores can be closed and opened selectively to allow released gases to move the microbes throughout the formation. The contaminated subsurface area 16 can then be selectively vacuumed utilizing wellbores 212 and 214 to remove the contaminants to the surface.

Figure 10:
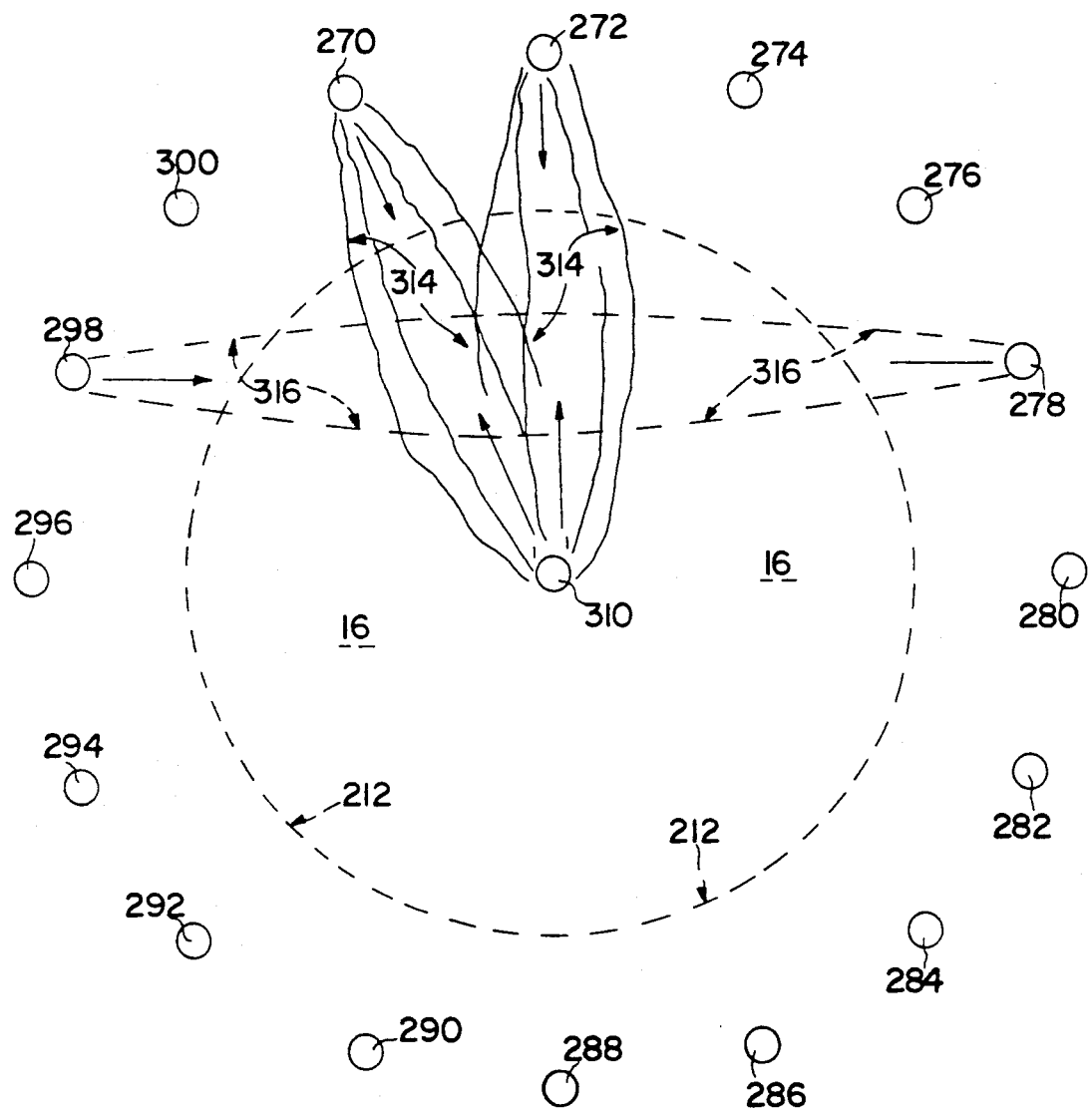
FIG. 10 is a top view of a schematic diagram illustrating another multiwell vacuum apparatus which can be used to inject and disperse substances such as toxiphilic bacteria throughout the vadose zone so as to recover contaminants in accordance with the principles of the invention.

FIG. 10 is a schematic of another multi-wellbore variation of the invention. This is considered a sixth recovery process. It should be understood that the wellbores discussed in this configuration of the invention are the same as previously disclosed herein. The wellbore pattern in FIG. 10 is circular and composed of a plurality of wellbores 270 through 300 that are used as injection wellbores in the contaminated subsurface area 16. A wellbore or wellbores 310 (one shown) in the center of the pattern is the recovery wellbore. Wellbore 310 is used to create the low pressure zone from which the contaminants are recovered in the contaminated subsurface area 16 which is shown by dashed lines 212. The injection well bores 270 through 300 are set at points around the recovery wellbore 310 to create communication channels such as channel 314 between injection wellbores 270 and 272 to recovery wellbore 310. Additional channels can then be created using this technique such as channel 316 between the injection wellbore 278 and wellbore 298. This particular configuration is not limited to injecting steam and/or water with chemicals. It can also be used to inject hot air into the contaminated subsurface area 16 to boil off the contaminants and drive them towards the recovery wellbore 310. With this configuration, the wellbores can be used alternately as injection and recovery wellbores by alternating the ports to create a multitude of paths or channels for recovery of contaminants. This allows a systematic sweeping of the entire contaminated subsurface area allowing the total recovery of the contaminants in the typical polluted vadose zone.

Another variation of the multiple well configuration is the use of four or more wellbores which are put in a horizontal, parallel array so as to bound a specific area. This embodiment involves the use of two or more rows of parallel wellbores in which each row is composed of two or more well-bores so as to create a rectangular "box" which encompasses part or all of the contaminated subsurface area. In this configuration, the water and surfactant solution is flushed back and forth between the two rows in such a way as to micellize all of the contaminants into the chemical-in-water or oil-in-water emulsion. This cross-flushing and vacuuming process is continued until there are no traces of the contaminants in the vacuumed effluent.

Certain of the steps that were described above for the single well configuration can also be used in the multi-well embodiment of the present invention. For instance, the entire polluted subsurface area can be "soaked" with hot air or steam prior to initiating the drive operation. In addition, all of the wellbores can be used as producers after "the steam soak" treatment has been completed.

An additional embodiment of the present invention involves the use of certain toxiphilic (toxin-degrading aerobic bacteria) that have proven useful in degrading liquid toxic contaminants into CO2 and benign and/or useful chemicals. This is the seventh recovery process.

This recovery stage can utilize toxiphilic aerobic bacteria in conjunction with the above described multi-well configurations. First, either toxiphilic bacterial spores (the preferable embodiment); or toxiphilic bacteria, are injected in water (or suspended in a polymerous solution), and are pumped under high pressure through a previously created "communication channel" from one wellbore port to its opposing port in another wellbore.

As soon as the production wellbore shows evidence that the injected spores have migrated from the injector, the process is terminated only for the two ports that have been used for that specific layer or zone. The process is repeated on a "zone" by "zone" basis until the entire contaminated area between the two wellbores is saturated with the toxiphilic spores. The spores are then "shocked" to "life" in one of several ways. One way is to flush hot water through their "zone". Another is to use a nutrient to "shock" them to life. A third way is to blow hot air across their zone. When the spores are activated, they become full-fledged bacteria who will proceed to consume the toxins around them.

The reason for using spores in the particular process, instead of the actual bacteria, is that the spores are smaller and can be more easily driven deep into the polluted zone. The spores will normally be injected into the formation in a polymerous solution (preferably xanthan gum), to reduce their "fallout" rate in their voyage from the injection to the producing well. When they are suspended in the polymerous solution, they are far less apt to be adsorbed onto particles of sand and clay.

After the bacteria are dispersed throughout the contaminated subsurface area and "shocked" to life, they can be further disbursed throughout the vadose zone by air and water which has been heated to the optimum temperature and controlled as to its movement by systematically opening and closing ports in the parallel wellbores. The multiple port arrangement further allows oxygen and additional nutrients to be injected in to the vadose zone in criss-crossing horizontal and diagonal patterns that will evenly dispense the toxiphilic microbes throughout the zone thereby effectuating total recovery of the pollutants.

In certain locations, the soil may be so impermeable that it will require that microbes be injected in between the wells that are disclosed in this invention. This injection process can be accomplished by a slim-hole water jet drill that jets microbe-carrying water radically outward from the verticle drill.

The process is repeated in this matter until the periodic "washing" of the formerly contaminated subsurface area fails to reveal any evidence of oil or toxic chemicals. At that time, the final step in the process will be taken which is to eradicate the bacterial colony by terminating its nutrient supply.

What is claimed:

1. An apparatus for removing underground contaminants from a contaminated subsurface area including:
    means, having an input and an output port, positioned in the contaminated subsurface area in a predetermined manner for releasing predetermined substances into selected areas of the contaminated subsurface area so that the substances and contaminates are intermixed and for recovering the intermixture of substances and contaminates from selected areas of the contaminated subsurface area;

means for rotating portions of the releasing and recovering means along a first predetermined path and for sliding the said portions of the releasing and recovering means along a second predetermined path;

means coupled to the input port of the releasing and recovery means for injecting the predetermined substances into the releasing and recovering means;

means coupled to the output port of the releasing and recovery means for applying pressure to the releasing and recovering means so that the intermixture of substances and contaminants can be extracted from the contaminated area; and means coupled to the pressure applying means for collecting and storing the intermixture of substances and contaminates as the intermixture is extracted from the contaminated subsurface area.

2. An apparatus for removing underground contaminants from a contaminated subsurface area as defined in claim 1 wherein the releasing and recovering means includes:

an outer housing having a plurality of spaced apertures formed therein;

an inner housing having a plurality of spaced apertures formed therein and recesses formed thereabout in the outer housing for rotatable and slidable movement; and a plurality of sealing rings positioned in a predetermined manner between the outer housing and the inner housing in spaced relationship in the recesses formed in the inner housing, each one of the plurality of sealing rings having a plurality of apertures formed therein which are alignable with the apertures in the inner housing and outer housing so that upon selective movement of the inner housing predetermined ones of the apertures in the outer housing, the sealing rings, and inner housing can be moved into direct alignment with each other.

3. An apparatus for removing underground contaminants from a contaminated subsurface area as defined in claim 2 wherein the rotating and sliding means includes:

a first drive member coupled to the inner housing;

a second drive member coupled to the first drive member;

means coupled to the second drive member for rotating the second drive member so that the second drive member can rotate the first drive member and thereby rotate the inner housing of the releasing and recovering means; and means having portions thereof coupled to the first drive member and other portions thereof coupled to the second drive member rotating means for sliding the second drive member and inner housing of the releasing and recovering means up and down.

4. An apparatus for removing underground contaminants from a contaminated subsurface area as defined in claim 3 wherein the second drive member rotating means includes:

a first gear;

a first shaft for rotably coupling the motor to the first gear;

a second gear coupled to the first gear so that the first gear drivingly engages the second gear;

a second shaft coupled to the second gear;

a third shaft coupled to the second drive member; and a third gear coupled to the third shaft and the second shaft so that the second shaft drivingly engages the third gear.

5. An apparatus for removing underground contaminants from a contaminated subsurface area as defined in claim 4 wherein the second drive member and inner housing sliding means includes:

a third drive member coupled to the first drive member;

a first piston member coupled to the third drive member;

a second piston member coupled to the third shaft; and means for activating the first and second piston members to move along a predetermined path.

6. An apparatus for removing underground contaminants from a contaminated subsurface area as defined in claim 5 wherein the first and second piston activating means is a pneumatic member.

7. An apparatus for removing underground contaminants from a contaminated subsurface area as defined in claim 6 wherein the injecting means includes:

means for storing a plurality of predetermined substances;

vacuum pump coupled to the outer housing of the releasing and recovering means for pulling the substances from the storing means and feeding the substances to the releasing and recovering means; and means for activating the vacuum pump.

8. An apparatus for removing underground contaminants from a contaminated subsurface area as defined in claim 7 wherein the substances storing means includes:

a first tank for storing a first predetermined substance;

second tank for storing a second predetermined substance;

a third tank for storing a third predetermined substance; and a fourth tank for storing a fourth predetermined substance.

9. An apparatus for removing underground contaminants from a contaminated subsurface area as defined in claim 8 wherein the vacuum pump activity means includes a motor.

10. An apparatus for removing underground contaminants from a contaminated subsurface area as defined in claim 9 wherein the means for applying a pressure to the releasing and recovering means includes:

means coupled to the outer housing of the releasing and recovering means for storing and condensing of the intermixture substances and contaminants; and means for creating a vacuum in the storing and condensing means so that a predetermined suction pressure is applied to the releasing and recovering means.

11. An apparatus for removing underground contaminants from a contaminated subsurface area as defined in claim 10 wherein the means for creating a vacuum in the storing and condensing means includes:

a vacuum pump coupled to the storing and condensing means; and a motor for activating the vacuum pump.

12. An apparatus for removing underground contaminants from a contaminated subsurface area including:

a first means having an input and an output port positioned in the contaminated subsurface area in a predetermined manner for releasing predetermined substances into selected areas of the contaminated subsurface area so that the substances and contaminates are intermixed and for recovering the intermixture of substances and contaminates from selected areas of the contaminated subsurface area;

means for rotating portions of the first means along a first predetermined path and for sliding the said portions of the first means along a second predetermined path;

means coupled to the input port of the releasing and recovering means for injecting the predetermined substances into the first means;

means coupled to the output port of the releasing and recovering means for applying pressure to the first means so that the intermixture of substances and contaminants can be extracted from the contaminated area;

means coupled to the first means pressure applying means for collecting and storing the intermixture of substances and contaminates as the intermixture is extracted from the contaminated subsurface area;

a second means positioned in a predetermined manner in the contaminated subsurface area for recovering the intermixture of substances and contaminates from selected areas of the contaminated subsurface area, the second means being positioned with and parallely spaced from the first means to allow communication channels to be formed therebetween;

means for rotating portions of the second means along a first predetermined path and for sliding the said portions of the second means along a second predetermined path;

means for applying pressure to the second means for pulling the predetermined substances from the first means to the second means thereby selectively creating communication channels therebetween and for extracting the intermixture of substances and contaminates from the contaminated area; and means coupled to the second means pressure applying means for collecting and storing the intermixture of substances and contaminates as the intermixture is extracted from the contaminated subsurface area.

13. An apparatus for removing underground contaminants from a contaminated subsurface area as defined in claim 12 wherein the first means includes:

an outer housing having a plurality of spaced apertures formed therein;

an inner housing, having a plurality of spaced apertures formed therein and recesses formed thereabout, positioned in the outer housing for rotatable and slidable movement; and a plurality of sealing rings positioned in a predetermined manner between the outer housing and the inner housing in spaced relationship in the recesses formed in the inner housing, each one of the plurality of sealing rings having a plurality of apertures formed therein which are alignable with the apertures in the inner housing and outer housing so that upon selective movement of the inner housing predetermined ones of the apertures in the outer housing, the sealing rings, and inner housing can be moved into direct alignment with each other.

14. An apparatus for removing underground contaminants from a contaminated subsurface area as defined in claim 13 wherein the second means includes:

an outer housing having a plurality of spaced apertures formed therein;

an inner housing, having a plurality of spaced apertures formed therein and recesses formed thereabout, positioned in the outer housing for rotatable and slidable movement; and a plurality of sealing rings positioned in a predetermined manner between the outer housing and the inner housing in spaced relationship in the recesses formed in sealing rings having a plurality of apertures formed therein which are alignable with the apertures in the inner housing and outer housing so that upon selective movement of the inner housing predetermined ones of the apertures in the outer housing, the sealing rings, and inner housing can be moved into direct alignment with each other.

15. An apparatus for removing underground contaminants from a contaminated subsurface area as defined in claim 14 wherein the first means rotating and sliding means includes:

a first drive member coupled to the inner housing;

a second drive member coupled to the first drive member;

means coupled to the second drive member for rotating the second drive member so that the second drive member can rotate the first drive member and thereby rotate the inner housing of the releasing and recovering means; and means having portions thereof coupled to the first drive member and other portions thereof coupled to the second drive member rotating means for sliding the second drive member and inner housing of the first means up and down.

16. An apparatus for removing underground contaminants from a contaminated subsurface area as defined in claim 15 wherein the second means rotating and sliding means includes:

a first drive member coupled to the inner housing;

a second drive member coupled to the first drive member;

means coupled to the second drive member for rotating the second drive member so that the second drive member can rotate the first drive member and thereby rotate the inner housing of the releasing and recovering means; and means having portions thereof coupled to the first drive member and other portions thereof coupled to the second drive member rotating means for sliding the second drive member and inner housing of the second means up and down.

17. An apparatus for removing underground contaminants from a contaminated subsurface area as defined in claim 16 wherein the second drive member rotating means of the first means rotating and sliding means includes:

a first gear;

a first shaft for rotably coupling the motor to the first gear;

a second gear coupled to the first gear so that the first gear drivingly engages the second gear;

a second shaft coupled to the second gear;

a third shaft coupled to the second drive member; and a third gear coupled to the third shaft and the second shaft so that the second shaft drivingly engages the third gear.

18. An apparatus for removing underground contaminants from a contaminated subsurface area as defined in claim 17 wherein the second drive member rotating means of the second means rotating and sliding means includes:

a first gear:
a first shaft for rotably coupling the motor to the first gear:
a second gear coupled to the first gear so that the first gear drivingly engages the second gear;
a second shaft coupled to the second gear;
a third shaft coupled to the second drive member; and
a third gear coupled to the third shaft and the second shaft so that the second shaft drivingly engages the third gear.

19. An apparatus for removing underground contaminants from a contaminated subsurface area as defined in claim 18 wherein the first injecting means includes:
means for storing a plurality of predetermined substances;
vacuum pump coupled to the outer housing of the first means for pulling the substances from the storing means and feeding the substances to the first means; and
means for activating the vacuum pump.

20. An apparatus for removing underground contaminants from a contaminated subsurface area as defined in claim 19 wherein the second drive member and inner housing sliding means of the first means rotating and sliding means includes:
a third drive member coupled to the first drive member;
a first piston member coupled to the third drive member;
a second piston member coupled to the third shaft; and
means for activating the first and second piston members to move along a predetermined path.

21. An apparatus for removing underground contaminants from a contaminated subsurface area as defined in claim 20 wherein the second drive member and inner housing sliding means of the second means rotating and sliding means includes:
a third drive member coupled to the first drive member;
a first piston member coupled to the third drive member;
a second piston member coupled to the third shaft; and
means for activating the first and second piston members to move along a predetermined path.

22. An apparatus for removing underground contaminants from a contaminated subsurface area as defined in claim 21 wherein the predetermined substances storing means coupled to the first means pressure applying means includes:
a first tank for storing a first predetermined substance;
second tank for storing a second predetermined substance;
a third tank for storing a third predetermined substance; and
a fourth tank for storing a fourth predetermined substance.

23. An apparatus for removing underground contaminants from a contaminated subsurface area as defined in claim 22 wherein the first and second piston activating means of the first means rotating and sliding means is a pneumatic member.

24. An apparatus for removing underground contaminants from a contaminated subsurface area as defined in claim 23 wherein the predetermined substances storing means coupled to the second means pressure applying means includes:

a first tank for storing a first predetermined substance;
second tank for storing a second predetermined substance; and
a third tank for storing a third predetermined substance; and
a fourth tank for storing a fourth predetermined substance.

25. An apparatus for removing underground contaminants from a contaminated subsurface area as defined in claim 24 wherein the first and second piston activating means of the second means rotating and sliding means is a pneumatic member.

26. An apparatus for removing underground contaminants from a contaminated subsurface area as defined in claim 25 wherein the means for applying a pressure to the first means includes:
means coupled to the outer housing of the first means for storing and condensing the intermixture substances and contaminants; and
means for creating a vacuum in the storing and condensing means so that a predetermined suction pressure is applied to the first means.

27. An apparatus for removing underground contaminants from a contaminated subsurface area as defined in claim 26 wherein the means for creating a vacuum in the first means storing and condensing means includes:
a vacuum pump coupled to the storing and condensing means; and
a motor for activating the vacuum pump.

28. An apparatus for removing underground contaminants from a contaminated subsurface area as defined in claim 27 wherein the means for applying a pressure to the second means includes:
means coupled to the outer housing of the second means for storing and condensing the intermixture of substances and contaminants; and
means for creating a vacuum in the storing and condensing means so that a predetermined suction pressure is applied to the second means.

29. An apparatus for removing underground contaminants from a contaminated subsurface area as defined in claim 28 wherein the means for creating a vacuum in the second means storing and condensing means includes:
a vacuum pump coupled to the storing and condensing means; and·
a motor for activating the vacuum pump.

30. An apparatus for removing underground contaminants from a contaminated subsurface area including:
a first plurality of means, having input and output ports, positioned in the contaminated subsurface area in a predetermined manner in a spaced circular configuration, each one of the plurality of means being provided for releasing predetermined substances into selected areas of the contaminated subsurface area so that the substances and contaminates are intermixed and for recovering the intermixture of substances and contaminants from selected areas of the contaminated subsurface area.
a first plurality of rotation means for rotating portions of, each of the first plurality of means along a first predetermined path and for sliding the said portions of each one of the first means along a second predetermined path;
a plurality of injecting means coupled to the input ports of the releasing and recovering means each one of the plurality of injecting means for injecting the predetermined substances into one of the plurality of the first plurality of means;

a first plurality of pressure applying means, coupled to the output ports of the releasing and recovering means each one of the plurality of pressure applying means for applying pressure to one of the plurality of the plurality of first means so that the intermixture of substances and contaminants can be extracted from the contaminated area;

a first plurality of collecting and storing means each one of the first plurality of collecting and storing means coupled to one of the first means pressure applying means for collecting and storing the intermixture of substances and contaminates as the intermixture is extracted from the contaminated subsurface area;

a second means positioned in a predetermined manner in the contaminated subsurface area for recovering the intermixture of substances and contaminates from selected areas of the contaminated subsurface area, the second means being positioned in the center of the plurality of first means to allow communication channels to be formed between each one of the first plurality of means and the second means;

means for rotating portions of the second means along a first predetermined path and for sliding the said portions of the second means along a second predetermined path;

means for applying pressure to the second means for pulling the predetermined substances from each one of the first plurality of means to the second means thereby selectively creating communication channels between each one of the first plurality of means and the second means and for extracting the intermixture of substances and contaminants from the contaminated area; and means coupled to the second means pressure applying means for collecting and storing the intermixture of substances and contaminants as the intermixture is extracted from the contaminated subsurface area.

31. An apparatus for removing underground contaminants from a contaminated subsurface area as defined in claim 30 wherein each one of the first plurality means includes:

an outer housing having a plurality of spaced apertures formed therein;

an inner housing, having a plurality of spaced apertures formed therein and recesses formed thereabout, positioned in the outer housing for rotatable and slidable movement; and a plurality of sealing rings positioned in a predetermined manner between the outer housing and the inner housing in spaced relationship in the recesses formed in the inner housing, each one of the plurality of sealing rings having a plurality of apertures formed therein which are alignable with the apertures in the inner housing and outer housing so that upon selective movement of the inner housing predetermined ones of the apertures in the outer housing, the sealing rings, and inner housing can be moved into direct alignment with each other.

32. An apparatus for removing underground contaminants from a contaminated subsurface area as defined in claim 31 wherein the second means includes:

an outer housing having a plurality of spaced apertures formed therein;

an inner housing, having a plurality of spaced apertures formed therein and recesses formed thereabout, positioned in the outer housing for rotatable and slidable movement; and a plurality of sealing rings positioned in a predetermined manner between the outer housing and the inner housing in spaced relationship in the recesses formed in the inner housing, each one of the plurality of sealing rings having a plurality of apertures formed therein which are alignable with the apertures in the inner housing and outer housing so that upon selective movement of the inner housing predetermined ones of the apertures in the outer housing, the sealing rings, and inner housing can be moved into direct alignment with each other.

33. An apparatus for removing underground contaminants from a contaminated subsurface area as defined in claim 32 wherein each one of the first plurality of rotating and sliding means includes:

a first drive member coupled to the inner housing;

a second drive member coupled to the first drive member;

means coupled to the second drive member for rotating the second drive member so that the second drive member can rotate the first drive member and thereby rotate the inner housing of the releasing and recovering means; and means having portions thereof coupled to the first drive member and other portions thereof coupled to the second drive member rotating means for sliding the second drive member and inner housing of the releasing and recovering means up and down.

34. An apparatus for removing underground contaminants from a contaminated subsurface area as defined in claim 33 wherein the each one of the second drive member rotating means of the first plurality of rotating and sliding means includes:

a first gear;

a first shaft for rotably coupling the motor to the first gear;

a second gear coupled to the first gear so that the first gear drivingly engages the second gear;

a second shaft coupled to the second gear;

a third shaft coupled to the second drive member; and a third gear coupled to the third shaft and the second shaft so that the second shaft drivingly engages the third gear.

35. An apparatus for removing underground contaminants from a contaminated subsurface area as defined in claim 34 wherein each one of the second drive member and inner housing sliding means of the first plurality of rotating and sliding means includes:

a third drive member coupled to the first drive member;

a first piston member coupled to the third drive member;

a second piston member coupled to the third shaft; and means for activating the first and second piston members to move along a predetermined path.

36. An apparatus for removing underground contaminants from a contaminated subsurface area as defined in claim 35 wherein the first and second piston activating means is a pneumatic member.

37. An apparatus for removing underground contaminants from a contaminated subsurface area as defined in claim 36 wherein each one of the plurality of injecting means includes:

means for storing a plurality of predetermined substances;

vacuum pump coupled to the outer housing of each one of the first plurality of means for pulling the substances from the storing means and feeding the substances to one of the first plurality of means; and means for activating the vacuum pump.

38. An apparatus for removing underground contaminants from a contaminated subsurface area as defined in claim 37 wherein each one of the predetermined substances storing means includes:

a first tank for storing a first predetermined substance;

a second tank for storing a second predetermined substance;

a third tank for storing a third predetermined substance; and a fourth tank for storing a fourth predetermined substance.

39. An apparatus for removing underground contaminants from a contaminated subsurface area as defined in claim 38 wherein each one of the vacuum pump activating means includes a motor.

40. An apparatus for removing underground contaminants from a contaminated subsurface area as defined in claim 39 wherein each one of the first plurality of pressure apply means for applying a pressure to one of the plurality of the first plurality of means includes:

means coupled to the outer housing of the each one of the first plurality of means for storing and condensing the intermixture of substances and contaminants; and means for creating a vacuum in each one of the storing and condensing means so that a predetermined suction pressure is applied to each one of the first plurality of means.

41. An apparatus for removing underground contaminants from a contaminated subsurface area as defined in claim 40 wherein each one of the means for creating a vacuum in each one of the storing and condensing means includes:

a vacuum pump coupled to each of the storing and condensing means; and a motor for activating each one of the vacuum pumps.

42. An apparatus for removing underground contaminants from a contaminated subsurface area as defined in claim 41 wherein the means for applying a pressure to the second means includes:

means coupled to the outer housing of the second means for storing and condensing the intermixture of substances and contaminants; and means for creating a vacuum in the storing and condensing means so that a predetermined suction pressure is applied to the second means.

43. An apparatus for removing underground contaminants from a contaminated subsurface area as defined in claim 42 wherein the means for creating a vacuum in the storing and condensing means includes:

a vacuum pump coupled to the storing and condensing means; and a motor for activating the vacuum pump.

44. An apparatus for positioning in a contaminated subsurface area to facilitate the removal of contaminants therefrom including:

an outer housing having a plurality of spaced apertures formed therein;

an inner housing, having a plurality of spaced apertures formed therein and recesses formed thereabout, positioned in the outer housing for rotatable and slidable movement; and a plurality of sealing rings positioned in a predetermined manner between the outer housing and the inner housing in spaced relationship in the recesses formed in the inner housing, each one of the plurality of sealing rings having a plurality of apertures formed therein which are alignable with the apertures in the inner housing and outer housing so that upon selective movement of the inner housing predetermined ones of the apertures in the outer housing, the sealing rings, and inner housing can be moved into direct alignment with each other.

45. A method for removing underground contaminants from a contaminated subsurface area including the steps of:

positioning a releasing and recovering means in the contaminated subsurface area;

activating a rotating and sliding means to sequentially and selectively open and close successive ports of the releasing and recovering means;

applying a vacuum pressure sequentially and selectively to each open port in the releasing and recovering means to recover contaminants from an adjacent area of the contaminated subsurface area; and activating the rotating and sliding means to close each of the successive opened ports in the releasing and recovery means before the next port thereof is opened so that upon the application of vacuum pressure the successive opened ports recovery of the contaminants in the entire contaminated subsurface area can be accomplished.

46. A method for removing underground contaminants from a contaminated subsurface area including the steps of:

positioning a releasing and recovering means in the contaminated subsurface area;

activating a rotating and sliding means to sequentially and selectively open and close successive ports of the releasing and recovering means;

injecting a predetermined substance into a top port of the releasing and recovering means so that the predetermined substance moves into and intermixes with the contaminants in selected areas of the contaminated subsurface area;

activating the rotation and sliding means to close the top port and open a bottom port of the releasing and recovery means;

injecting the predetermined substance into the bottom port of the releasing and recovering means;

activating the rotating and sliding means to close the bottom port and open the top port of the releasing and recovering means;

applying a vacuum pressure to the top port of the releasing and recovering means so that the predetermined substance flows toward the top port of the releasing and recovering means;

activating the rotating and sliding means to close the top port and open the bottom port of the releasing and recovering means; and applying a vacuum pressure sequentially and selectively to each port in the releasing and recovering means beginning with the bottom port thereof until recovery of the contaminants in the entire contaminated subsurface area is completed.

47. A method for removing underground contaminants from a contaminated subsurface area as defined in claim 46 wherein the predetermined substance is steam.

48. A method for moving underground contaminants from a contaminated subsurface area as defined in claim 47 with the addition of a step of injecting chemicals into the steam.

49. A method for removing underground contaminants from a contaminated subsurface area as defined in claim 48 with the addition of a step of injecting dry heat sequentially and selectively into each port of the releasing and recovering means and then applying a vacuum pressure sequentially and selectively to each port in the releasing and recovering means until further recovery of the contaminants in the contaminated subsurface area is completed.

50. A method for removing underground contaminants from a contaminated subsurface area including the steps of:
positioning a first releasing and recovering means in the contaminated subsurface area;
positioning a second recovering means in the contaminated subsurface area in parallel spaced relationship to the first releasing and recovering means;
activating a first rotating and sliding means to open successive ports of the first releasing and recovering means;
activating a second rotating and sliding means to open successive ports of the second recovering means at the same time an adjacently aligned port of the first releasing and recovering means is opened;
injecting a predetermined substance into each opened port of the first releasing and recovering means while applying a vacuum pressure to the adjacently aligned opened port of the second recovering means so that the predetermined substance is pulled along a predetermined path between the aligned ports in the first releasing and recovering means and the second recovering means;
activating the first and second rotating and sliding means to close each of the successive opened ports in the first releasing and recovering means and the second recovery means before the next ports between the first releasing and recovery means and the second recovery means are open;
activating the first and second rotating and sliding means to close all the ports of the first releasing and recovery means and the second recovery means;
activating the first and second rotating and sliding means to open bottom ports of the first the releasing and recovering means and the second recovering means;
applying a vacuum pressure sequentially and selectively to each port in the first releasing and recovering means and the second recovering means beginning with bottom ports thereof until recovery of the contaminants in the entire contaminated subsurface area is completed.

51. A method for removing underground contaminants from a contaminated subsurface, area as defined in claim 50 wherein the predetermined substance is steam.

52. A method for removing underground contaminants from a contaminated subsurface area as defined in claim 51 with the addition of a step of injecting chemicals into the steam.

53. A method for removing underground contaminants from a contaminated subsurface area as defined in claim 52 with the addition of a step of injecting dry heat sequentially and selectively into each port of the first releasing and recovering means and then applying a vacuum pressure sequentially and selectively into each port in the first releasing and recovering means and the second recovering means until further recovery of the contaminants in the contaminated subsurface area is completed.

54. A method for removing underground contaminants from a contaminated subsurface area as defined in claim 50 with the addition of a step of injecting toxiphilic aerobic bacteria into the steam.

55. A method for removing underground contaminants from a contaminated subsurface area including the steps of:
positioning a plurality of first releasing and recovering means in the contaminated subsurface area in a spaced circular configuration;
positioning a second recovering means in the contaminated subsurface area in the center of the plurality of first releasing and recovering means;
activating successively one of a plurality of first rotating and sliding means to open successive ports of one of the plurality of first releasing and recovering means;
activating a second rotating and sliding means to open successive ports of the second recovering means at the same time an adjacently aligned port of one of the plurality of the first releasing and recovering means is opened;
injecting a predetermined substance into each opened port of one of the plurality of first releasing and recovering means while applying a vacuum pressure to the adjacently aligned opened port of the second recovering means so that the predetermined substance is pulled along a predetermined path between the aligned ports in the first releasing and recovering means and the second recovering means;
activating the first and second rotating and sliding means to close each of the successive opened ports in the first releasing and recovering means and the second recovery means before the next ports between the first releasing and recovering means and the second recovering means are open;
activating the first and second rotating and sliding means to close all the ports of the first releasing and recovering means and the second recovering means;
activating the first and second rotating and sliding means to open bottom ports of the first releasing and recovery means and the second recovery means; and
applying a vacuum pressure sequentially and selectively to each port in the first releasing and recovering means and the second recovery means beginning with the bottom ports thereof until recovery of the contaminants in the entire contaminated subsurface area is completed.

56. A method for removing underground contaminants from a contaminated subsurface area as defined in claim 55 wherein the predetermined substance is steam.

57. A method for removing underground contaminants from a contaminated subsurface area as defined in claim 56 with the addition of a step of injecting chemicals into the steam.

58. A method for removing underground contaminants from a contaminated subsurface area as defined in claim 57 with the addition of a step of injecting dry heat sequentially and selectively into each port of the plurality of first releasing and recovering means and then applying a vacuum pressure sequentially and selectively into each port of the plurality of the first releasing and recovering means and the second recovering means until further recovery of contaminants in the contaminated subsurface area is completed.

59. A method for removing underground contaminants from a contaminated subsurface area as defined in claim 56 with the addition of a step of injecting toxiphilic aerobic bacteria into the steam.

* * * * *